T. KURZ.
INSECT TRAP.
APPLICATION FILED JULY 26, 1915.
1,201,745.
Patented Oct. 17, 1916.
2 SHEETS—SHEET 1.
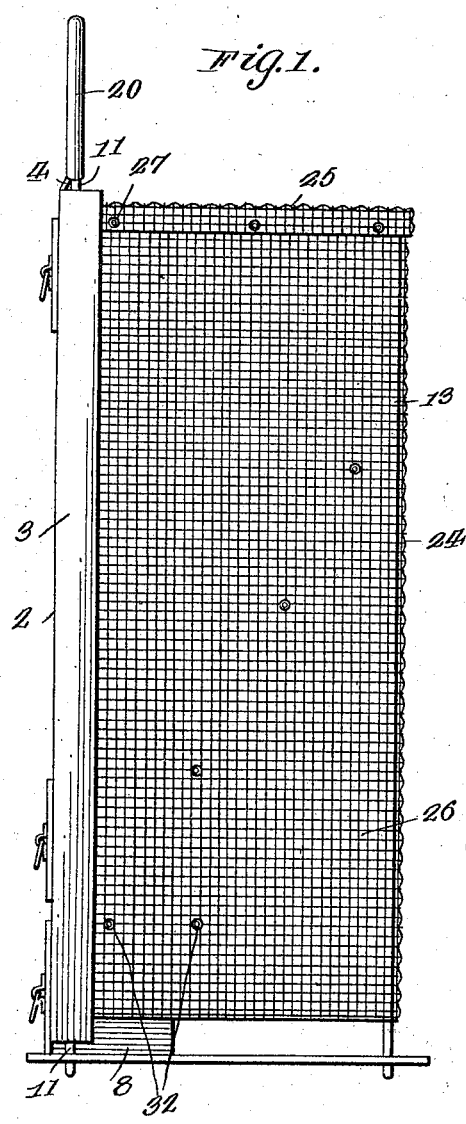
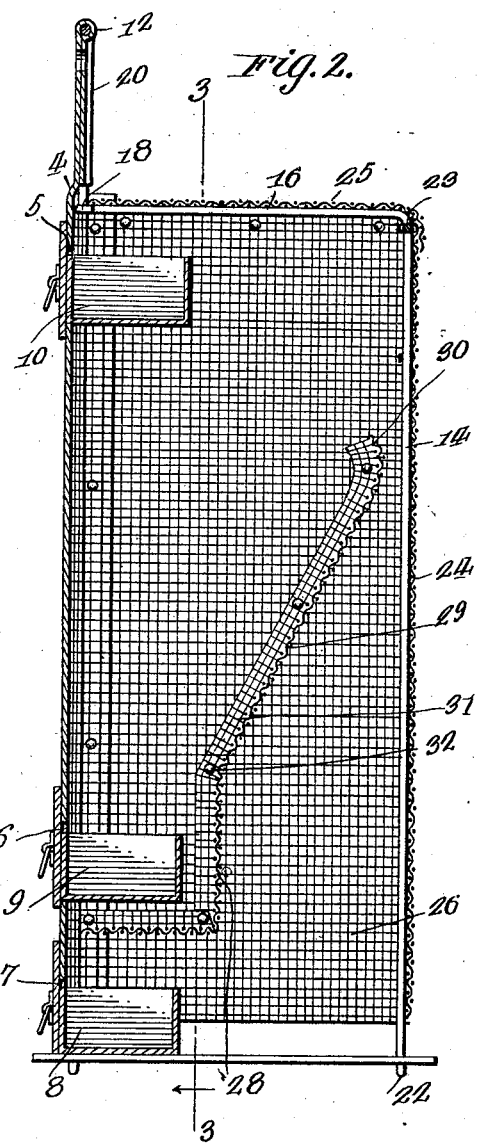
Theophile Kurz, Inventor
Witnesses
By Richard B. Owen,
Attorney T. KURZ.
INSECT TRAP.
APPLICATION FILED JULY 26, 1915.
1,201,745.
Patented Oct. 17, 1916.
2 SHEETS—SHEET 2.
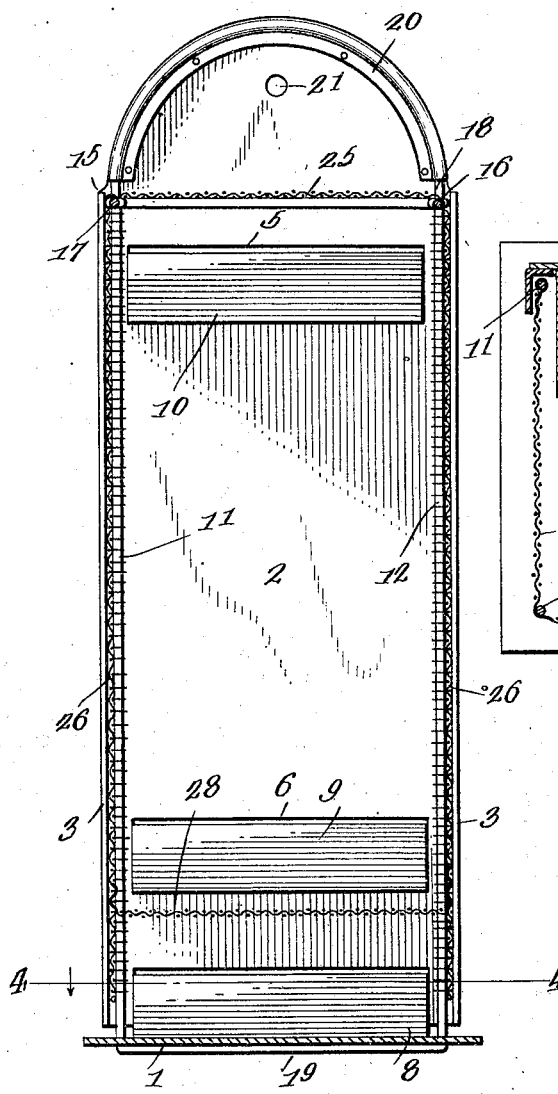
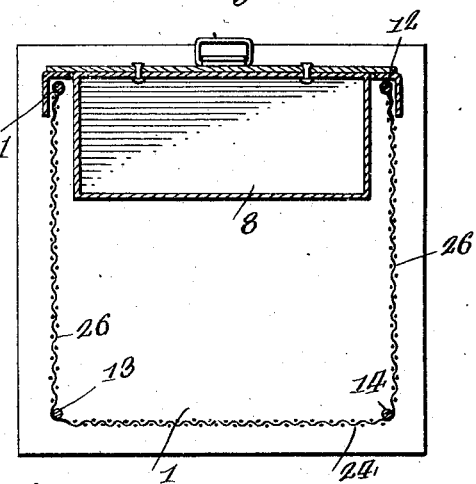
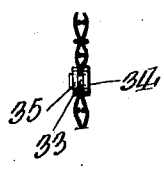
Inventor
Theophile Kurz.
Witnesses
Guy M. Spring
By Richard B. Owen.
Attorney

UNITED STATES PATENT OFFICE.

THEOPHILE KURZ, OF BURLINGTON, OKLAHOMA.

INSECT-TRAP.

1,201,745. Specification of Letters Patent. Patented Oct. 17, 1916.

Application filed July 26, 1915. Serial No. 42,034.

*To all whom it may concern:*

Be it known that I, THEOPHILE KURZ, a citizen of the United States, residing at Burlington, in the county of Alfalfa and State of Oklahoma, have invented certain new and useful Improvements in Insect-Traps, of which the following is a specification.

My invention relates to insect traps.

The primary object of my invention is to provide an insect trap which does not require any attention, and remains set for use continuously.

Another object of my invention is to provide an insect trap which is simple in construction, strong and durable, and effective in operation.

A further object of my invention is to provide an insect trap which may be transported from place to place and is provided with means for inducing insects to enter the same and other means for destroying them.

With the above and other objects in view my invention resides preferably in the construction, combination, and arrangement of parts as hereinafter set forth in the specification and illustrated in the accompanying drawings, in which—

Figure 1 is a side elevation of an insect trap embodying the improvements of my invention. Fig. 2 is a vertical sectional view of the same. Fig. 3 is a similar view taken on the line 3—3 of Fig. 2. Fig. 4 is a transverse sectional view taken on the line 4—4 of Fig. 3 looking in the direction of the arrow. Fig. 5 is a detail sectional view of an improved fastening means employed in the preferred embodiment of my invention.

Similar reference characters indicate similar parts throughout the various views of the drawings.

In the drawings wherein the preferred embodiment of my invention is illustrated, I provide an insect trap including a base plate 1 having extending therefrom a vertical wall 2, which, in the present instance, comprises the rear wall of the trap, and is preferably solid. The rear wall 2 is provided with longitudinal marginal flanges 3 for a purpose which will hereinafter appear. The rear wall 2 is offset adjacent its upper extremity, as indicated at 4, for a purpose which will hereinafter appear. Suitable openings 5, 6 and 7 are provided in the rear wall 2 for reception of a bait container 8, an insect receiver 9, and a poison receiver 10, these receptacles 8, 9 and 10 comprising in the present instance drawers, said drawers having the usual handles for facilitating the removal and insertion of the same into position.

I provide a supporting frame for the side, front, and top walls of my improved trap, said supporting frame including vertical rear standards 11 and 12, and similar front standards 13 and 14. The standards 13 and 14 are bent laterally inwardly adjacent their upper extremities to provide top walls supporting rods 15 and 16, said rods connecting, as at 17 and 18, with the standards 11 and 12. The standards 11 and 12 may include one strand of wire, the same being bent upon itself and provided with a lateral portion 19 lying subjacent the base plate 1, the standards projecting through suitable openings in said base. The upper extremities of the standards 11 and 12 are curved into substantially semi-circular form and the upper marginal edge of the rear wall 2 is curved to conform to said standards and folded upon itself into engagement with the standards, as indicated at 20. A suitable opening 21 is provided in the wall 2, whereby the same may be hung from a hook or the like adjacent a door, window, or some point at which insects collect. The standards 13 and 14 are similarly formed to the standards 11 and 12, the lateral portion 22 thereof lying parallel with the base 1 and the standards 13 and 14 projecting through suitable openings provided in said base. A transverse strengthening rod 23 extends between the standards 13 and 14 adjacent the point at which the same are bent to provide the rods 15 and 16 in order to insure rigidity of the supporting frame.

The front, top, and side walls are preferably formed of wire mesh screen and are designated 24, 25, and 26. As clearly shown in Figs. 2, 3 and 4, the walls 24, 25, and 26 are disposed about the supporting frame comprising the standards 11, 12, 13 and 14. The top wall 25 may be made separate from the front walls 24 and 26, the said top wall being connected thereto by means of rivets or the like 27, one of said rivets being shown in detail in Fig. 5 and will be described hereinafter.

A partition is provided in the body of the trap which includes a rightangular portion 28 disposed adjacent and lying below the receptacle 9. The partition is preferably formed of wire mesh screen, as clearly illustrated in Fig. 2, and extends angularly upwardly through the body of the trap to provide an inclined wall 29 terminating in an inwardly curved portion 30. The said partition including the portion 28 and the wall 29 is provided with a suitable flange 31 which is riveted, as indicated at 32, to the side walls 26. This inclined wall 29 not only provides means for directing the insects into the upper section of the trap, but also prevents their egress and serves as a means for directing insects when destroyed into the receptacle 9.

As shown in Fig. 5, I have provided improved fastening means which preferably comprises a rivet including a shank portion 33 having a head 34, and a washer 35 receivable on said shank. The free extremity of the shank 33 is swaged into engagement with the washer 35 when the rivet is placed in position and serves to secure the sections clamped.

From the above description, taken in connection with the accompanying drawings, it is thought that a clear and comprehensive understanding of the construction, operation and advantages of my invention may be readily gathered.

It will be noted that the lower marginal edges of the front and side walls of the trap terminate a short distance above the base 1 so as to provide an inlet aperture. Suitable bait may be placed in the receptacle 8 to entice insects, and when the same attempt to leave the trap, they will be directed into the upper portion thereof by virtue of the inclined wall 29. A suitable insect poison may be placed in the receptacle 10 and the insects will be destroyed by contact with the poison, causing them to drop into the receptacle 9, the wall 29 serving as a deflector for directing the insects into said receptacle.

It will be noted that no complicated structure is included in my invention, and that the same is easily cleaned and replenished with the required materials for destroying the insects. The flanges 3, hereinbefore mentioned, serve to provide strengthening means for supporting the inner marginal edges of the side walls 26, and it will be appreciated by those skilled in the art that this structure is one that is not only strong and durable but cheap to manufacture.

While I have shown and described my invention as embodying the specified structure, it is, of course, to be understood that I may make such changes in the details thereof as do not depart from the spirit and scope of the invention as claimed.

What is claimed is:

An insect trap, including a base, a solid rear wall, a supporting frame, front, top and side walls on said supporting frame, a partition associated therewith providing upper and lower chambers, a bait receptacle removably carried by said rear wall and arranged adjacent the top, a receptacle to receive dead insects removably carried by the rear wall and arranged adjacent the lower end of the upper receptacle, and a second removable bait receiving receptacle arranged in the lower portion.

In testimony whereof I affix my signature in presence of two witnesses.

THEOPHILE KURZ.

Witnesses:
C. M. BREDEHOFT,
H. C. DOHERTY.